US005126186A

United States Patent [19]

Cheek

[11] Patent Number: 5,126,186

[45] Date of Patent: Jun. 30, 1992

[54] ENHANCEMENT OF FABRIC RIBBON TYPE IMPRESSIONS

[76] Inventor: Maurice R. Cheek, 3229 Columbia St., San Diego, Calif. 92103

[21] Appl. No.: 719,373

[22] Filed: Jun. 24, 1991

[51] Int. Cl.[5] .............................................. B32B 3/02

[52] U.S. Cl. .................................... 428/195; 427/195; 427/197; 427/202; 427/205; 427/391; 427/411; 428/913; 428/914

[58] Field of Search ............... 427/195, 197, 202, 205, 427/391, 395, 411; 346/76 PH; 400/120 IT; 428/195, 913, 914

[56] References Cited

U.S. PATENT DOCUMENTS

| | | | |
|---|---|---|---|
| 4,079,673 | 3/1978 | Bernstein | 427/197 |
| 4,321,610 | 3/1982 | Moore | 346/108 |
| 4,603,337 | 6/1986 | Erlichman | 346/76 PH |
| 4,609,926 | 9/1986 | Aviram et al. | 346/76 PH |
| 4,611,393 | 9/1986 | Norigoe | 29/602 R |
| 4,630,069 | 12/1986 | Erlichman | 346/76 PH |
| 4,675,698 | 6/1987 | Tsutsumi | 346/76 PH |
| 4,783,667 | 11/1988 | Brooks | 346/76 PH |
| 4,847,641 | 7/1989 | Tung | 346/154 |

FOREIGN PATENT DOCUMENTS

| | | | |
|---|---|---|---|
| 2508972 | 9/1975 | Fed. Rep. of Germany | 427/195 |

OTHER PUBLICATIONS

Brewer, *An Approach to Print*, (Blandford Press, London) pp. 76–77 (1971).

Campbell, *The Designer's Handbook*, (MacDonald & Co, London) p. 135 (1983).

Craig, *Production for the Graphic Designer*, (Watson–Guptill, New York) p. 91 (1974).

Dennis et al., *Comprehensive Graphic Arts*, (Howard W. Sams, Indianapolis) pp. 342–343 (1974).

Field, *Graphic Arts Manual*, (Arno, New York) p. 426 (1980).

Stevenson, *Graphic Arts Encyclopedia*, (McGraw–Hill, New York) p. 374 (1968).

*Primary Examiner*—Shrive Beck
*Assistant Examiner*—Terry J. Owens
*Attorney, Agent, or Firm*—Brown, Martin Haller & McClain

[57] ABSTRACT

A method of enhancement of a type impression printed by impact from an ink bearing fabric ribbon which involves applying thermographic powder to the type impression, applying heat to the type impression and thermogaphic powder at a temperature (usually about 100°–150° C./212°–302° F.) and for a time (usually a few seconds) sufficient to melt the thermographic powder, and allowing the melted thermographic powder to cool and adhere to the type impression. Ribbons which may be used in this process include cloth, nylon and similar fabric ribbons but exclude such non-fabric ribbons as film ribbons. Further, the ribbon must be ink bearing and cannot be a ribbon of the type commonly referred to as a "carbon ribbon". The powder may also contain a material capable of imparting an opaque, metallic or pigmented appearance to the enhanced type impression. Products which may be formed by this process include letterheads, sales presentations, greeting cards, announcements, reports, personalized stationery, graphs, charts, labels, certificates, invitations, business cards, menus, and posters.

18 Claims, No Drawings

ENHANCEMENT OF FABRIC RIBBON TYPE IMPRESSIONS

BACKGROUND OF THE INVENTION

I. Field of the Invention

The invention herein relates to enhancement of type impressions.

II. Background Information

It is desirable in many cases to enhance the type impression on a paper sheet by raising the type impression or giving the appearance of the impression being raised. In some cases the impression is physically raised, as occurs in an embossing process. Such processes, however, are very expensive since they require the formation of a embossing dye, and a new dye must be formed for each different type impression which it is desired to form.

In order to reduce the expense of providing a raised type impression, the process of thermography was developed a number of years ago. In thermography specially developed slow drying inks are used to print a type impression on a sheet using conventional (usually typeset or rubber stamp) printing methods. Thereafter, while the slow drying ink remains wet, thermography powder is spread on the wet ink, heat is applied and the thermography powder is fused with the wet ink. The resulting type impression gives the impression of being raised, since the impression now has a thick coating of the fused thermography powder overlaying the type impression and incorporated at its lower service into the wet ink. Each sheet is then allowed to sit for sufficient time for the coated slow drying ink to dry and the sheet can then be used in a conventional manner.

The thermography process and the slow-drying inks used in the process have been widely described in the literature. Typical examples of such descriptions will be found in Campbell, The Designer's Handbook, 135 (1983); Craig, Production for the Graphic Designer, 91 (1974); and Dennis, et al., Comprehensive Graphic Arts, Unit 119 (1974). Heretofore, however, there was no recognition by the art that an equivalent enhancement of type impressions could be obtained from any other types of inked impressions, and particularly there was no recognition that type impressions from mechanical ribbons could be so enhanced.

Also known is the thermal printing or thermal transfer process, which uses an electrically resistive apparatus to fuse ink to a paper. This process, however, requires complex equipment and specially formulated resistive printing inks, and is not analogous to thermography.

In recent years, many of the sheet products, such as letterheads, brochures and the like, which previously were produced by conventional print techniques and in commercial print shops, have more and more been produced directly by the end users themselves, particularly using personal computers and word processing or desk top publishing software and dot matrix or impact printers. However, there has been no ability for creating the enhanced raised appearance of the impressions from such printers, so that in order to obtain such enhancement the consumers have been forced to forego their use of in-house word processing or desk top printing capabilities and return to the commercial printers for conventional wet ink thermography. It would therefore be of significant advantage for users to have a process which will enable them to enhance type impressions formed by dot matrix and impact printers and similar printing devices, without the necessity of having to have the enhanced printing produced by commercial print shops. It would also be advantageous for such a process to be conducted quickly, easily and inexpensively right in the user's own office or home or even at the user's own desk.

SUMMARY OF THE INVENTION

The invention herein is the method of enhancement of a type impression printed by impact from an ink bearing fabric ribbon which comprises applying thermographic powder to the type impression, applying heat to the type impression and thermographic powder at a temperature and for a time sufficient to melt the thermographic powder, and allowing the melted thermographic powder to cool and adhere to the type impression. Ribbons which may be used in this process include cloth, nylon and similar fabric ribbons but exclude such non-fabric ribbons as film ribbons formed from polymers such as "Mylar TM." Further, the ribbon must be ink bearing and cannot be a ribbon of the type commonly referred to as a "carbon ribbon" where the medium forming the print impression is a carbonaceous powder simply coated onto the surface of the ribbon.

In preferred embodiments the thermographic powder will also contain a material capable of imparting a metallic or pigmented appearance to the enhanced type impression.

DETAILED DESCRIPTION AND PREFERRED EMBODIMENTS

The invention herein is a novel process which provides to users of conventional home and office printing devices such as typewriters, dot matrix printers and impact (daisy wheel) printers the ability to produce printed sheets which give the appearance of raised type or print equivalent to that previously obtained only through commercial thermography printing. The invention herein is based on the unexpected and surprising discovery that, contrary to the long-standing beliefs and teachings of the prior art, type impressions made by conventional home and office printing devices using ink bearing fabric ribbons can be enhanced in a manner similar to that of prior art wet ink thermography, notwithstanding that the ink impressions produced by these devices have heretofore been believed to be so dissimilar to the thermography wet inks that such enhancement was not believed possible.

The process of the present invention first requires formation of the type impression, which can be formed from any printing device which uses an ink bearing fabric ribbon. Preferred among these will be dot matrix printers, impact printers (often referred to as "daisy wheel" or "thimble" printers) and typewriters. Typewriters and impact printers normally form the type impressions using type bars or daisy wheel or thimble stalks which each have formed thereon one or more letters, numbers or symbols. Dot matrix printers form the type impression by simultaneously striking the ribbon against the paper surface with one or more of a cluster of closely grouped pins. Most commercial dot matrix printers have the pins in a cluster of 9 or 24 pins, depending on the degree of resolution and printing speed which the manufacturer wishes to obtain. The dot matrix printers are more versatile in forming type impressions than are the impact printers or typewriters, since the dot matrix printers can form any figure or "graphic," including letters, numbers and symbols, which can be formed in whole or in part from the simultaneous impact of some or all of the pins in the print head group. It is also possible to form extended figures by combining the appearance of two or more adjacent pin impressions or "pixels." Consequently, as used herein the term "type impression" is intended to be construed broadly to encompass not only conventional letters, numbers and symbols as may be produced by any of the aforesaid devices, but also those additional symbols and "graphics" which may be produced by dot matrix printers using one pixel or a plurality of adjoining or associated pixels.

The printer or typewriter must have an ink bearing fabric ribbon from which the type impression is formed by striking the type bar, type stalk or dot matrix pins against the ribbon and onto the underlying paper surface. I have determined that the process of this invention will not work with non-fabric ribbons, which can be defined as those film ribbons (usually formed of polymers such as "Mylar TM ") which are not in the form of ink bearing ribbons but rather which are produced by coating with carbon particles or similar carbonaceous materials and which are commonly referred to commercially as "carbon ribbons." For the purpose of this invention, fabric ribbons are considered to be those made of materials such as cotton cloth, nylon cloth or the like, which are formed usually by matting or weaving to provide a fabric onto whose surface the ink is applied and into which the ink penetrates and is generally impregnated. The distinction between fabric ribbons and non-fabric ribbons as described above will be readily understood by those skilled in the art.

Ribbons of a hybrid sort known as "multi-strike" ribbons have been tried in this process and have been found to be of only marginal operability. Consequently, while some such ribbons might be of use, the preferred fabric ribbons of the present invention will be other than the "multi-strike" ribbons.

The ink useful herein may be any of the conventional inks used for typewriter ribbons, printer ribbons and the like. Excluded, as discussed above, are carbon coatings of the type used on "carbon ribbons" and similar carbonaceous coatings. The inks useful herein are defined by the art as quick drying or non-wet inks, and differ significantly from the slow-drying wet inks which are used in the prior art thermography processes.

After the type impression is formed by the printer or typewriter, standard thermography powder is dusted, sprinkled, blown or otherwise deposited over the type impression. The amount of time elapsing from the formation of the impression to the deposition of the thermography powder is not critical, since the standard ribbon inks useful in this invention are substantially dry within seconds after the impression is formed. Therefore by the time the user can remove the printed sheet from the printer and prepare to apply the thermography powder, the ink in the type impression has reached substantial equilibrium and will not significantly change its properties with respect to fusion with the thermography powder for a substantial period of time, commonly at least about one hour. It is, however, preferred that the deposition and subsequent heating and cooling steps of the process be performed within a few minutes of the time that the printed sheet is removed from the printer, preferably within no more than about 5 to 10 minutes of the removal from the printer, to obtain the best results.

The thermography powder may be applied by dusting with a soft brush; by sprinkling or shaking from a spoon, spatula, container or other supply source; by blowing with an "air puff" device or similar low velocity blowing device; or by any other spreading technique. The type impression area to be enhanced should be fully covered by the powder layer. Portions of the type impression which are not to be enhanced can be masked off with paper, plastic film or otherwise. Thereafter the excess loose powder is shaken off, commonly by tapping the paper sheet gently and allowing the excess powder which is not in contact with the type impression to drop off of the sheet. This excess loose powder may be collected and reused.

Once the excess powder has been removed, so that only powder applied to the print impression itself remains, the paper with the print impression and powder is heated to a temperature and for a time sufficient to cause the thermography powder to melt substantially completely. After the thermography powder has melted, the heat is removed and the sheet allowed to cool so that the molten thermography powder solidifies and is simultaneously fused or adhered to the ink of the type impression. Once the sheet and powder have cooled completely, the sheet with the enhanced type impression can be used in its normal manner.

Thermography powder is commonly formed of powdered resin which has a relatively low melting temperature. Thermography powders of different types have been manufactured for many years and the particular polymers used are commonly proprietary information of the individual manufacturers. I have found particularly satisfactory a thermography powder commercially available from the Therm-O-Boss Company (Escondido, Calif.) which is identified by the vendor as being formed from a fatty acid based polyamide resin which is identified as similar to the resin identified by Chemical Abstracts Service (CAS) Registry No. 68,915,560. However, it is anticipated that substantially any commercial thermography powder will be satisfactory in the present invention.

If color, sheen and/or opaqueness is desired in the enhanced impression, one can incorporate into the thermography powder an additive material which provides opacity, pigmentation or a metallic sheen or appearance. Typical additives of this type are bronze, gold, silver, copper or aluminum powders; mica flakes; inorganic pigments such as titanium dioxide; various colored organic pigments; opacifiers; and fluorescent colors, which may be used individually or in mixtures as desired. Many thermographic powders have such materials already incorporated into them as commercial products; see the aforesaid Dennis et al. and Craig references, as well as Stevenson, Graphic Arts Encyclopedia, 374 (1968). In the absence of any of these additives, the resins comprising the thermography powders will normally solidify as clear materials after melting, which will allow the underlying color of the type impression to show through while still providing a raised appearance and usually also a glossy or satin finish appearance.

The time and temperature relationship for melting of the thermography powder will of course be dependent upon the particular resin used in the selected powder. Commonly the resins used in commercial thermography powders melt at a temperature not much above the boiling point of water. Typically such melting points will be in the range of 100°-150° C. (212°-302° F.), preferably in the range of about 100°-130 ° C. (212°-266° F.), and most preferably about 105°-115° C. (221°-239° F.). The aforementioned Therm-O-Boss commercial thermographic powder based on the polyamide resin has a melting point of 109° C. (228° F.). While of course temperatures substantially above the melting point of the powder may theoretically be used, that is not preferred since there is a clear possibility of scorching the underlying paper surface or deteriorating the resin or the incorporated pigment particles or both. Further, no particular advantage is obtained by using significant higher temperatures, since once the powder resin melts its adhesion to the underlying ink upon cooling is quite satisfactory and the adhesion is not increased by greater heating.

The amount of time required will be dependent upon the particular heat source and the proximity to the heat source that one places the paper sheet. Normally a few seconds will be quite adequate. Suitable heat sources include such conventional devices as clothing irons (but emptied of water so that only heat and not steam is produced), hot plates, electric skillets or griddles, light bulbs (usually of at least 150 watts), kitchen toasters, hair dryers or any other heating device, and particularly those which heat primarily by infrared radiation. The heating device should be one which produces controlled heating (preferably primarily radiative heating) and which is safe for the user to be close to. Thus heating sources such as open flames from a candle, laboratory burner or the like may be used, but are not recommended since the heat emission is not easily controllable, mostly convective rather than radiative, and can produce local hot spots which could damage the paper or the print coating. Commercial thermography heaters are available and may be used.

The paper with the type impression and the thermographic powder will be held in the presence of the heating device for the sufficient time to allow the thermography powder to melt. This will normally be only a matter of up to perhaps one minute, usually about 1-15 seconds; the exact time will of course be dependent on the amount of type impression to be enhanced (i.e., the amount of powder to be melted) and the type of heating device used. As a typical example, one can use a conventional home clothing iron with the temperature setting set for ironing wool fabrics, normally producing a temperature of about 135° C. (275° F.). The iron is set upside down in an appropriate holding device, which may be a deep metal bowl or the like, and the paper is placed on the heated sole of the iron for about 1-5 seconds. The paper may be pressed against the sole of the iron with a wooden or metal stylus. The user is cautioned not to place his or her fingers against the heated surfaces or the paper in contact with the heated surface. The paper may however be held at its edges so that the user's hands and fingers are away from the heating surface of the iron. Similar techniques will be used for heating with light bulbs or the like. When one uses a hot plate, electric skillet or griddle or toaster as a heating source, it is preferable to place a piece of metal foil over the device and move the paper around on top of the metal foil. An air-moving heating device, such as a hair dryer, should be used at the high-temperature, low-air-speed setting to avoid moving the thermography powder particles while they are heating to their melting point.

Once the thermography powder has melted across the entire type impression, the paper is removed from the heat source and the molten thermography powder allowed to cool and solidify, simultaneously adhering to the underlying ink of the type impression. Normally such cooling to a solidified state and subsequently to ambient temperature requires only a few seconds or minutes. Once the cooling is complete the paper with the enhanced type impression may be used for its intended purpose.

The above process will be found to be very useful for the production of a wide variety of paper products, including but not limited to letterheads, sales presentations, greeting cards, announcements, reports, personalized stationery, graphs, charts, labels, certificates, invitations, business cards, menus, posters and many more similar objects.

It will be evident that there are numerous embodiments of the present invention which, while not expressly described above, are clearly within the scope and spirit of the present invention. The above description is therefore intended to be exemplary only, and the scope of the invention is to be defined solely by the appended claims.

I claim:

1. A method for enhancement of a type impression printed by impact from an ink-bearing fabric ribbon which comprises:

applying thermographic powder to said type impression;

applying heat to said type impression and thermographic powder at a temperature and for a time sufficient to melt said thermographic powder; and allowing said melted thermographic powder to cool and adhere to said type impression.

2. A method as in claim 1 wherein said type impression is formed by a typewriter having a fabric ribbon.

3. A method as in claim 1 wherein said type impression is formed by a dot matrix printer having a fabric ribbon.

4. A method as in claim 1 wherein said type impression is formed by an impact printer having a fabric ribbon.

5. A method as in claim 1 wherein said fabric ribbon comprises a cloth ribbon.

6. A method as in claim 1 wherein said thermographic powder comprises a polyamide resin.

7. A method as in claim 6 wherein said thermographic powder comprises a polyamide resin having incorporated therein an additive material providing an opaque, metallic or pigmented appearance to said type impression.

8. A method as in claim 7 wherein said material comprises particles of a metal, mineral, inorganic compound or pigment.

9. A method as in claim 8 wherein said material comprises a pigment.

10. A method as in claim 8 wherein said material comprises particles selected from the group consisting of bronze, gold, silver, copper, aluminum, mica and titanium dioxide particles.

11. A method as in claim 1 wherein said temperature is in the range of from about 100° C. to about 150° C.

12. A method as in claim 11 wherein said temperature is in the range of from about 100° C. to about 130° C.

13. A method as in claim 11 wherein said temperature is about 105°-115° C.

14. A method as in claim 1 wherein said time up to about one minute.

15. A method as in claim 14 wherein said time is in the range of from about one second to about fifteen seconds.

16. An article having thereon an enhanced type impression formed according to the process of claim 1.

17. An article as in claim 16 comprising a sheet of material having thereon said enhanced type impression.

18. An article as in claim 17 wherein said sheet of material comprises a sheet of paper.

* * * * *